United States Patent

Matsushima

(10) Patent No.: US 9,212,647 B2
(45) Date of Patent: Dec. 15, 2015

(54) CONTROL APPARATUS OF INTERNAL COMBUSTION ENGINE

(71) Applicant: Yuhei Matsushima, Chiyoda-ku (JP)

(72) Inventor: Yuhei Matsushima, Chiyoda-ku (JP)

(73) Assignee: Mitsubishi Electric Corporation, Tokyo (JP)

( * ) Notice: Subject to any disclaimer, the term of this patent is extended or adjusted under 35 U.S.C. 154(b) by 172 days.

(21) Appl. No.: 13/847,178

(22) Filed: Mar. 19, 2013

(65) Prior Publication Data

US 2014/0116383 A1  May 1, 2014

(30) Foreign Application Priority Data

Oct. 26, 2012  (JP) .................................. 2012-236230

(51) Int. Cl.
| | |
|---|---|
| *F02P 5/152* | (2006.01) |
| *G01L 23/22* | (2006.01) |
| *F02D 37/02* | (2006.01) |
| *F02P 5/15* | (2006.01) |

(52) U.S. Cl.
CPC .............. *F02P 5/152* (2013.01); *F02P 5/1525* (2013.01); *F02P 5/1526* (2013.01); *G01L 23/225* (2013.01); *F02D 37/02* (2013.01); *F02P 5/1502* (2013.01); *Y02T 10/46* (2013.01)

(58) Field of Classification Search
CPC ....... F02P 5/1518; F02P 5/152; F02P 5/1525; F02P 5/1526; F02P 5/1502; F02D 37/02
USPC ............. 123/406.19, 406.29, 406.38, 406.39, 123/406.23
See application file for complete search history.

(56) References Cited

U.S. PATENT DOCUMENTS

| | | | | |
|---|---|---|---|---|
| 4,492,114 A | * | 1/1985 | Yamanaka ............ | F02B 77/085 73/114.26 |
| 5,583,785 A | * | 12/1996 | Hainey ................ | H04L 27/1525 324/76.54 |
| 5,821,412 A | * | 10/1998 | Bryant .................. | G01M 15/11 73/114.02 |
| 6,877,482 B2 | * | 4/2005 | Kinose .................... | F02P 5/152 123/406.29 |
| 7,472,687 B2 | * | 1/2009 | Zhu ......................... | F02P 17/12 123/406.14 |
| 7,478,624 B2 | * | 1/2009 | Kaneko ................. | F02D 35/027 123/406.37 |
| 7,588,015 B2 | * | 9/2009 | Kaneko ................... | F02P 5/152 123/406.21 |
| 7,653,477 B2 | * | 1/2010 | Yoshihara ............. | F02D 35/027 123/406.34 |

(Continued)

FOREIGN PATENT DOCUMENTS

| | | | | |
|---|---|---|---|---|
| JP | 4237845 A | 8/1992 | | |
| JP | 3780549 B2 | 5/2006 | | |
| JP | 2009115011 A | * | 5/2009 | .............. F02D 45/00 |

OTHER PUBLICATIONS

Communication dated Jun. 2, 2015 from the State Intellectual Property Office of the People's Republic of China in counterpart application No. 201310135896.X.

*Primary Examiner* — Stephen K Cronin
*Assistant Examiner* — Kevin R Steckbauer
(74) *Attorney, Agent, or Firm* — Sughrue Mion, PLLC; Richard C. Turner

(57) ABSTRACT

A vibration waveform of a knock-specific frequency component of an internal combustion engine is calculated over a plurality of ignition cycles of the internal combustion engine according to an output of a knock sensor and an output of a crank angle sensor. An actual ignition timing is calculated by detecting a position corresponding to a crank angle at which a standard deviation of the vibration waveform exceeds a predetermined first determination level as a vibration position by combustion of the internal combustion engine.

10 Claims, 5 Drawing Sheets

(56) References Cited

U.S. PATENT DOCUMENTS

| | | | | |
|---|---|---|---|---|
| 7,963,269 B2* | 6/2011 | Kaneko | ............ | F02P 5/152 |
| | | | | 123/406.24 |
| 8,005,607 B2* | 8/2011 | Yoshihara | ............ | F02P 5/152 |
| | | | | 123/406.29 |
| 8,186,329 B2* | 5/2012 | Wermuth | ............ | F02D 41/1462 |
| | | | | 123/299 |
| 8,205,489 B2* | 6/2012 | Kaneko | ............ | G01L 23/225 |
| | | | | 73/114.01 |
| 8,418,674 B2* | 4/2013 | Yasuhara | ............ | F02D 35/028 |
| | | | | 123/299 |
| 2004/0044292 A1* | 3/2004 | Yasushi | ............ | A61B 5/0245 |
| | | | | 600/509 |
| 2006/0129304 A1* | 6/2006 | Takemura | ............ | G01L 23/225 |
| | | | | 701/111 |
| 2008/0000449 A1* | 1/2008 | Kaneko | ............ | F02D 35/027 |
| | | | | 123/406.37 |
| 2009/0118989 A1* | 5/2009 | Padhi | ............ | G01L 23/225 |
| | | | | 701/111 |
| 2010/0224168 A1 | 9/2010 | Yasuhara et al. | | |
| 2011/0153182 A1* | 6/2011 | Sasaki | ............ | F02D 35/027 |
| | | | | 701/111 |
| 2012/0192833 A1* | 8/2012 | Hagari | ............ | F02D 35/027 |
| | | | | 123/406.35 |
| 2012/0296558 A1* | 11/2012 | Ono | ............ | F02P 5/152 |
| | | | | 701/111 |
| 2013/0333662 A1* | 12/2013 | Okada | ............ | F02D 35/02 |
| | | | | 123/319 |

* cited by examiner

CONTROL APPARATUS OF INTERNAL COMBUSTION ENGINE

BACKGROUND OF THE INVENTION

1. Field of the Invention

The present invention relates to a control apparatus of an internal combustion engine, and more particularly, to a control apparatus of an internal combustion engine furnished with a function of detecting an ignition timing of fuel supplied to the internal combustion engine.

2. Background Art

A fuel injection control apparatus has been proposed for an internal combustion engine called a diesel engine that performs diffusional combustion by fuel injection. This fuel injection control apparatus detects a combustion timing, that is, an ignition timing of fuel on the basis of a vibration induced when fuel burns using an acceleration sensor (knock sensor) provided to an engine block and controls a fuel injection timing according to the detected ignition timing. This configuration is described, for example, in Patent Document 1.

There is another fuel injection control apparatus that determines whether the detected vibration is induced by ignition or noise on the basis of a correlation between a fuel injection timing and an ignition timing and controls a fuel injection timing according to the determination result. This configuration is described, for example, in Patent Document 2.

CITATION LIST

Patent Documents

Patent Document 1: JP-A-4-237845
Patent Document 2: Japanese Patent No. 3780549

The fuel injection control apparatus in the related art disclosed in Patent Document 1, however, has a problem that there is a case where a noise vibration, which is a vibration induced not by ignition but by actuations of components provided to the internal combustion engine, such as inlet valves and exhaust valves, is superimposed on a frequency component/a vibration waveform, and in such a case, the fuel injection control apparatus erroneously detects the noise vibration as an ignition-induced vibration.

Meanwhile, the fuel injection control apparatus in the related art disclosed in Patent Document 2 has a problem that the fuel injection control apparatus fails to detect an exact ignition timing when the detected vibration is determined as noise-induced vibration and therefore becomes incapable of correcting the fuel injection timing. Also, because a noise determination is made on the basis of a correlation between the fuel injection timing and the ignition timing, the fuel injection control apparatus has another problem that a noise determination cannot be made when neither the fuel injection timing nor the ignition timing varies, that is, when a drive condition remains unchanged, and the fuel injection control apparatus fails to detect an exact ignition timing. The fuel injection control apparatus has still another problem that a noise determination cannot be made, for example, in a case where a correlation is not necessarily established between the fuel injection timing and the ignition timing as with an internal combustion engine (called HCCI engine) configured to perform pre-mixed compression ignited combustion and therefore the fuel injection control apparatus fails to detect an exact ignition timing.

SUMMARY OF THE INVENTION

The invention is devised to solve the problems of the fuel injection control apparatuses in the related art as discussed above and has an object to provide a control apparatus of an internal combustion engine capable of detecting an ignition timing with accuracy and without influences of a noise vibration independently of a combustion method of the internal combustion engine and hence capable of controlling an ignition timing with accuracy.

A control apparatus of an internal combustion engine according to an aspect of the invention includes: a knock sensor that detects a vibration of the internal combustion engine and generates an output containing a signal corresponding to the detected vibration; a crank angle sensor that detects a crank angle of the internal combustion engine and outputs a signal corresponding to the detected crank angle; a vibration waveform calculation unit that calculates a vibration waveform of a knock-specific frequency component of the internal combustion engine over a plurality of ignition cycles of the internal combustion engine according to an output of the knock sensor and an output of the crank angle sensor; a vibration waveform standard deviation calculation unit that calculates a standard deviation of the calculated vibration waveform over the plurality of ignition cycles; a vibration position detection unit that detects, as a vibration position by combustion of the internal combustion engine, a position corresponding to the crank angle at which the calculated standard deviation of the vibration waveform exceeds a predetermined first determination level; an actual ignition timing calculation unit that calculates an actual ignition timing of the internal combustion engine according to the detected vibration position; and an ignition timing adjustment unit that is capable of adjusting an ignition timing of the internal combustion engine according to the calculated actual ignition timing.

The control apparatus of an internal combustion engine includes: the vibration waveform calculation unit that calculates a vibration waveform of a knock-specific frequency component of the internal combustion engine over a plurality of ignition cycles of the internal combustion engine; the vibration waveform standard deviation calculation unit that calculates a standard deviation of the calculated vibration waveform over the plurality of ignition cycles; the vibration position detection unit that detects, as a vibration position by combustion of the internal combustion engine, a position corresponding to the crank angle at which the calculated standard deviation of the vibration waveform exceeds the predetermined first determination level; the actual ignition timing calculation unit that calculates an actual ignition timing of the internal combustion engine according to the detected vibration position; and the ignition timing adjustment unit that is capable of adjusting an ignition timing of the internal combustion engine according to the calculated actual ignition timing. Owing to this configuration, there can be achieved an excellent advantage that the control apparatus is capable of detecting an ignition timing with accuracy and without influences of a noise vibration independently of a combustion method of the internal combustion engine and hence capable of controlling an ignition timing with accuracy.

The foregoing and other objects features, aspects, and advantages of the present invention will become more apparent from the following detailed description of the present invention when taken in conjunction with the accompanying drawings.

DETAILED DESCRIPTION OF THE EMBODIMENTS

First Embodiment

Figure 1:
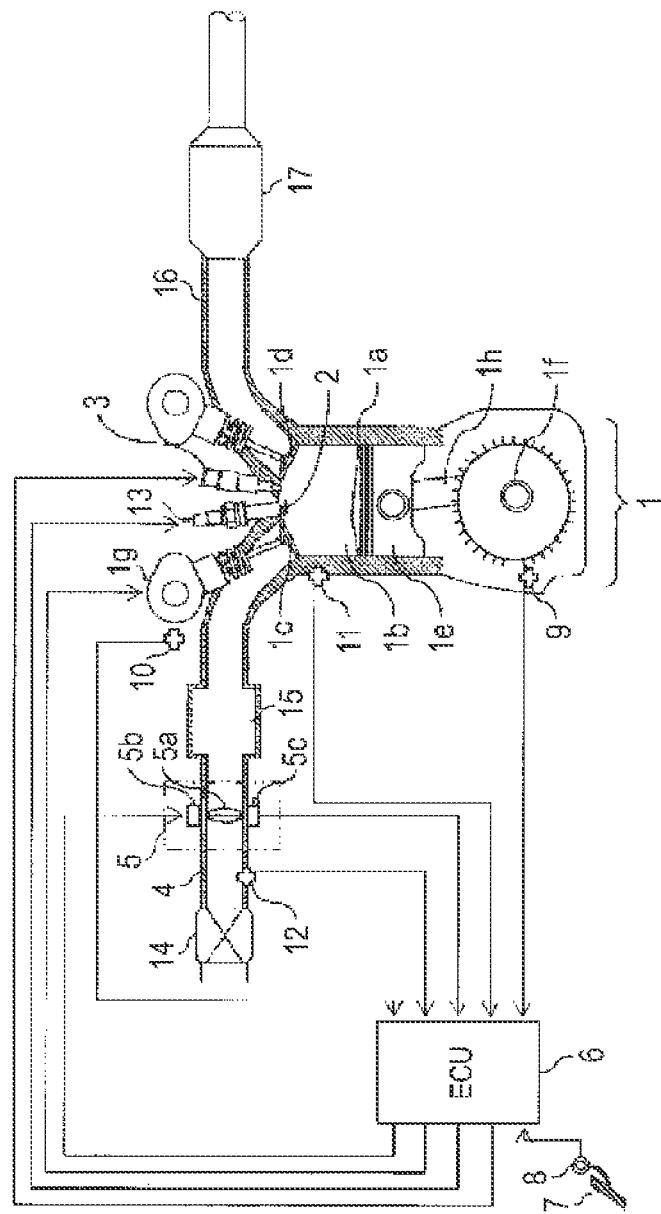
FIG. 1 is a view showing an overall configuration of a control apparatus of an internal combustion engine according to a first embodiment of the invention.

Hereinafter, a control apparatus of an internal combustion engine according to a first embodiment of the invention will be described in detail with reference to the drawings. FIG. 1 is a view showing an overall configuration of the control apparatus of the internal combustion engine according to the first embodiment of the invention in a case where the invention is applied to an internal combustion engine (SI engine) that performs pre-mix combustion by spark ignition.

Referring to FIG. 1, an inlet valve 1c, an exhaust valve 1d, and a piston 1e are provided to a combustion chamber 1b of a cylinder 1a in an internal combustion engine (hereinafter, referred to simply as the engine) 1. Further, a spark plug 2 and an injector 3 are provided so as to face an interior of the fuel combustion chamber 1b. Also, an amount of intake air to the engine 1 is regulated by an electronic control throttle 5 provided in an intake passage 4. The electronic control throttle 5 is formed of a throttle valve 5a, a motor 5b that drives the throttle valve 5a, and a throttle opening sensor 5c that detects an opening of the throttle valve 5a.

An engine control unit (hereinafter, abbreviated to ECU) 6 obtains an output signal of an accelerator position sensor 8 that detects an amount of operation of an accelerator pedal 7 and sends a control signal to the motor 5b so that the throttle valve 5a is controlled to open at an adequate opening according to a throttle valve opening signal from the throttle opening sensor 5c. A crank angle sensor 9 detects a crank angle of a crankshaft 1f and a cam angle sensor 10 detects a cam angle of a camshaft 1g on an inlet side. Also, a knock sensor 11 detects a vibration of the engine 1. Each of the sensors 9, 10, and 11 inputs an output signal based on a detection value into the ECU 6.

The ECU 6 obtains output signals from the accelerator position sensor 8, the crank angle sensor 9, the cam angle sensor 10, an airflow sensor 12, and the knock sensor 11 as well as various sensors (not shown) and determines a spark timing and a fuel injection amount or the like. According to the respective determined values, the ECU 6 supplies fuel by driving the injector 3 to inject fuel into the combustion chamber 1b and discharges a spark from a plug gap of the spark plug 2 by driving an ignition coil 13 connected to the spark plug 2.

A flow rate of intake air, from which dust and foreign matter are removed by an air cleaner 14, is measured by the air flow sensor 12. Then, the intake air is introduced into a surge tank 15 by passing through the electronic control throttle 5. Further, the intake air in the surge tank 15 is introduced into the combustion chamber 1b by passing through the inlet valve 1c. The intake air introduced into the combustion chamber 1b and fuel injected from the injector 3 are mixed together and form an air-fuel mixture. The air-fuel mixture is ignited to burn by a spark discharge of the spark plug 2.

A combustion pressure of the air-fuel mixture is transmitted to the piston 1e to let the piston 1e reciprocate. Reciprocating motion of the piston 1e is transmitted to the crankshaft 1f via a connecting rod 1h and converted to rotary motion, which is extracted as an output of the engine 1. The burnt air-fuel mixture produces an exhaust gas that is discharged to an exhaust manifold 16 by passing through the exhaust valve 1d. The exhaust gas is then purified by a catalyst 17 and released to atmosphere.

Figure 2:
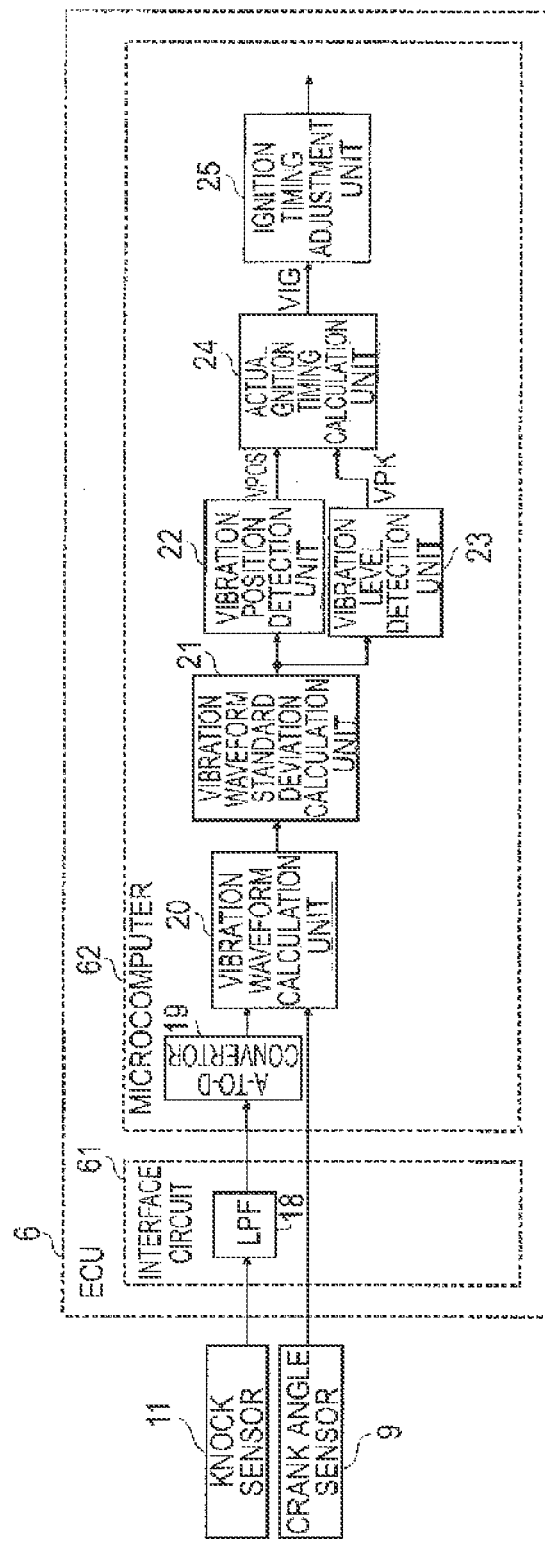
FIG. 2 is a block diagram showing an ignition timing control unit in the control apparatus of the internal combustion engine according to the first embodiment of the invention.

An ignition timing control unit provided in the ECU 6 of the control apparatus of the internal combustion engine according to the first embodiment of the invention will now be described with reference to FIG. 2. FIG. 2 is a block diagram showing the ignition timing control unit in the control apparatus of the internal combustion engine according to the first embodiment of the invention. Referring to FIG. 2, a crank angle sensor 9 and a knock sensor 11 are the crank angle sensor 9 and the knock sensor 11, respectively, shown in FIG. 1.

The ECU 6 includes an interface circuit 61 and a microcomputer 62. The interface circuit 61 includes a low-pass filter (hereinafter, abbreviated to LPF) 18 used to remove a high-frequency component from an output signal of the knock sensor 11. A bias voltage, for example, of 2.5 [V] is applied to the LPF 18 so that a center of vibration components contained in the output signal of the knock sensor 11 falls on 2.5 [V]. For all the vibration components contained in an output signal of the knock sensor 11 to be taken into an A-to-D convertor 19, an output characteristic of the LPF 18 is set in such a manner that the vibration components of an output signal of the knock sensor 11 fall within a range of 0 [V] to 5 [V] with the bias voltage of 2.5 [V] at the center. The LPF 18 is furnished with a gain conversion function that amplifies an output signal from the knock sensor 11 with 2.5 [V] at the center when the vibration components of the output signal are small and reduces the output signal with 2.5 [V] at the center when the vibration components are large.

The microcomputer 62 is formed of an A-to-D convertor that converts an analog signal to a digital signal, a ROM region in which to store a control program and control constants, a RAM region in which to store variables when the program is run, and so on. The microcomputer 62 includes, as chief components of the ignition timing control unit, the A-to-D convertor 19, a vibration waveform calculation unit 20, a vibration waveform standard deviation calculation unit 21, a vibration position detection unit 22, a vibration level detection unit 23, an actual ignition timing calculation unit 24, and an ignition timing adjustment unit 25.

The A-to-D convertor 19 converts an analog signal from the knock sensor 11 filtered by the LPF 18 to a digital signal at regular time intervals (for example, every 10 [μs] or every 20 [μs]). Alternatively, the A-to-D convertor 19 may be configured so as to constantly perform A-to-D conversion and to output data only in a crank angle section necessary for processing after the A-to-D conversion. Further, the A-to-D converter 19 may be configured so as to perform A-to-D conversion only for a crank angle section necessary for processing after the A-to-D conversion and to output the conversion result.

The vibration waveform calculation unit 20 applies a frequency analysis to a digital signal from the A-to-D convertor 19 by digital signal processing upon receipt of the digital signal from the A-to-D convertor 19 and an output signal from the crank angle sensor 9 as inputs and calculates a vibration waveform of a predetermined frequency component (for example, 5 [kHz] to 7 [kHz]). As the digital signal processing, for example, processing called discrete Fourier transform (DFT) or short-time Fourier transform (STFT) is used. By the digital signal processing, a spectrum of the predetermined frequency component (hereinafter, referred to as the vibration intensity VI) is calculated as the vibration waveform every predetermined time or at every predetermined crank angle.

Alternatively, the predetermined frequency component may be extracted using an IIR (Infinite Impulse Response) filter or an FIR (Finite Impulse Response) filter as the digital signal processing. Further, the vibration waveform calculation unit 20 may carry out an operation while A-to-D conversion is applied to an analog signal from the LPF 18 or carry out operations collectively by interrupt processing in synchronization with rotations of the engine 1.

Incidentally, vibrations of the engine 1 include a noise vibration induced by an actuation of the engine 1 besides a combustion-induced vibration and there may be a case where these noises are superimposed on the predetermined frequency component. Such a noise vibration is a vibration induced by an actuation of components provided to the engine 1, such as the injectors 3, the inlet valves 1c and the exhaust valves 1d or an engine-specific vibration induced by an actuation of the pistons 1e and so on. Accordingly, in a case where the vibration waveform detected by the vibration waveform calculation unit 20 is used intact for a vibration position detection, there is a possibility that these noise vibrations are erroneously detected as the combustion-induced vibration.

In order to eliminate such an inconvenience, the control apparatus of the internal combustion engine according to the first embodiment of the invention is configured so as to calculate a standard deviation of a vibration waveform by subjecting the vibration waveform over a plurality of ignition cycles calculated by the vibration waveform calculation unit 20 to filter processing over a plurality of ignition cycles by the vibration waveform standard deviation calculation unit 21, and to detect a vibration position using the calculated standard deviation of the vibration waveform by the vibration position detection unit 22. The control apparatus is therefore capable of calculating a combustion-induced vibration alone without influences of the noise vibration.

More specifically, the vibration waveform standard deviation calculation unit 21 calculates a standard deviation of the vibration waveform over the predetermined ignition cycles calculated by the vibration waveform calculation unit 20 in accordance with Equations (1) and (2) as follows:

$$VIA[n] = KVIA \times VIA[n-1] + (1-KVIA) \times VI[n] \quad \text{Equation (1)}$$

where VIA [n] is a mean value of vibration intensity (vibration waveform mean value), VI [n] is vibration intensity, and KVIA is a filter coefficient for calculation of a mean value;

$$VSGM[n] = KVSGM \times VSGM[n-1] + (1-KVSGM) \times (VI[n] - VIA[n]) \quad \text{Equation (2)}$$

where VSGM [n] is a standard deviation of vibration intensity (vibration waveform standard deviation), KVSGM is a filter coefficient for calculation of a standard deviation.

Herein, [n] means processing at the ignition timing of this time and [n−1] means processing at the ignition timing of the last time. Also, the vibration intensity VI is a value calculated by the vibration waveform calculation unit 20 at every predetermined crank angle. The mean value of vibration intensity, VIA, and the standard deviation of the vibration intensity, VSGM [n], are calculated at every predetermined crank angle.

The vibration position detection unit 22 detects a position at which the standard deviation of the vibration waveform calculated by the vibration waveform standard deviation calculation unit 21 first exceeds a predetermined first determination level J1 as a vibration position VPOS. Herein, the first determination level J1 is empirically set for each cylinder in advance on the basis of a speed and a load of the engine 1.

Figure 3:
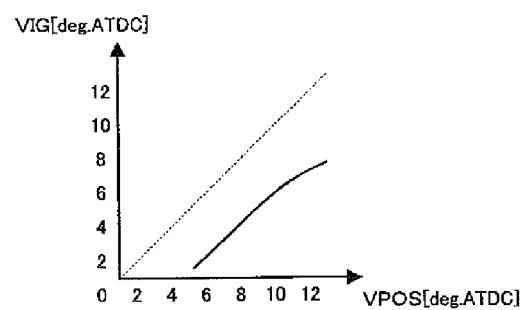
FIG. 3 is a characteristic map showing a relation between a vibration position and an actual ignition timing in the control apparatus of the internal combustion engine according to the first embodiment of the invention.

The actual ignition timing calculation unit 24 calculates an actual ignition timing VIG from a characteristic map as is shown in FIG. 3 according to the vibration position VPOS detected by the vibration position detection unit 22. More specifically, FIG. 3 is a characteristic map showing a relation between a vibration position and an actual ignition timing in the control apparatus of the internal combustion engine according to the first embodiment of the invention and created in consideration of a transmission delay until the combustion-induced vibration is transmitted to the knock sensor 11. Referring to FIG. 3, the ordinate is used for the actual ignition timing VIG [deg. ATDC (After Top Death Center)] and the abscissa is used for the vibration position VPOS [deg. ATDC] at which the standard deviation of the vibration waveforms first exceeds the first determination level J1. For example, given that the vibration position VPOS [deg.ATDC] at which the standard deviation of the vibration waveform first exceeds the first determination level J1 is 10 [deg.ATDC], then the actual ignition timing VIG is calculated to be about 6 [deg.ATDC].

The vibration level detection unit 23 detects a peak value of the standard deviation of the vibration waveform for the crank angle calculated by the vibration waveform standard deviation calculation unit 21 as a vibration level VPK. In a case where the vibration level VPK thus detected is below a predetermined second determination level J2, the vibration level detection unit 23 inhibits a calculation of the actual ignition timing VIG by the actual ignition timing calculation unit 24 described above. Herein, the second determination level J2 is empirically set for each cylinder in advance on the basis of a speed and a load of the engine 1 and set above the first determination level J1.

The ignition timing adjustment unit 25 adjusts an energization timing of the ignition coil 13 according to the actual ignition timing VIG calculated by the actual ignition timing calculation unit 24 to achieve an optimal ignition timing of the air-fuel mixture and varies a timing (spark timing) of a spark discharge of the spark plug 2 by advancing or retarding the timing. In a case where a calculation of the actual ignition timing VIG by the actual ignition timing calculation unit 24 is inhibited by the vibration level detection unit 23, the ignition timing adjustment unit 25 inhibits an adjustment of retarding the ignition timing.

The sequential processing described above eliminates the need to perform a noise determination on the basis of a correlation between the spark timing (fuel injection timing for the diesel engine of Patent Document 2) and the ignition timing as with the ignition timing detection method of Patent Document 2 and makes it possible to detect an ignition timing with accuracy independently of a combustion method of the engine and hence to control an ignition timing with accuracy. It should be noted that respective Equations above are mere examples to describe an operation of the first embodiment and the invention is not limited to Equations above.

Figure 4:
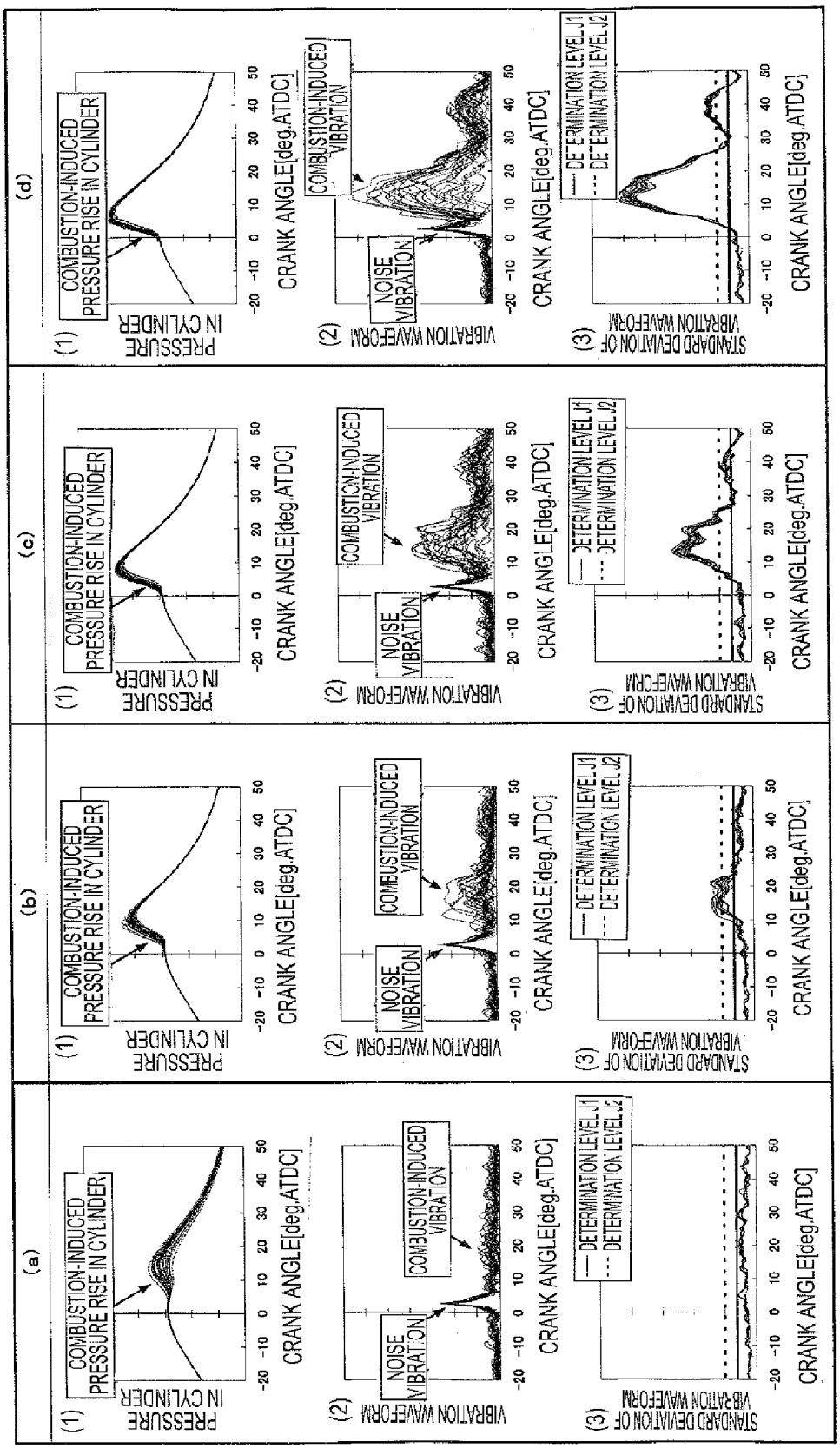
FIG. 4 is a view used to describe a vibration position detection in a case where a combustion-induced vibration and a noise vibration induced by an actuation of the engine are superimposed on a frequency component/a vibration waveform in the control apparatus of the internal combustion engine according to the first embodiment of the invention.

A detection of the vibration position in a case where the combustion-induced vibration and the noise vibration induced by an actuation of the engine are superimposed on the vibration waveform will now be described. FIG. 4 is a view used to describe a vibration position detection in a case where the combustion-induced vibration and the noise vibration induced by an actuation of the engine 1 are superimposed on the vibration waveform in the control apparatus of the internal combustion engine according to the first embodiment of the invention. Boxes (a), (b), (c), and (d) of FIG. 4 contain waveform charts at different spark timings and each box contains waveform charts showing a pressure in cylinder, a vibration waveform calculated by the vibration waveform calculation unit 20, and a standard deviation of the vibration waveform calculated by the vibration waveform standard deviation calculation unit 21. More specifically, in each of the boxes (a) through (d) of FIG. 4, a chart (1) is a waveform chart of a pressure in cylinder showing a pressure in cylinder superimposed on the crank angle over a plurality of ignition cycles, a chart (2) is a vibration waveform chart showing the vibration waveform calculated by the vibration waveform calculation unit 20 and superimposed on the crank angle over a plurality of ignition cycles, and a chart (3) is a waveform chart of a vibration waveform standard deviation showing a standard deviation of the vibration waveform calculated by the vibration waveform standard deviation calculation unit 21 and superimposed on the crank angle over a plurality of ignition cycles. The spark timings are advanced sequentially from the boxes (a), (b), (c), and (d) of FIG. 4.

When the spark timing varies, the positions of the pressure-in-cylinder waveform, the vibration waveform, and the vibration waveform standard deviation waveform with respect to the crank angle vary, too. For example, as the spark timing advances sequentially from the boxes (a), (b), (c), and (d) of FIG. 4, as are shown in the pressure-in-cylinder waveform charts (1), the vibration waveform charts (2), and the vibration waveform standard deviation waveform charts (3) in the respective boxes (a), (b), (c), and (d) of FIG. 4, the positions of the pressure-in-cylinder waveform, the vibration waveform, and the vibration waveform standard deviation waveform with respect to the crank angle also advance sequentially from the boxes (a), (b), (c), and (d), of FIG. 4.

As are shown in the vibration waveform charts (2) in the boxes (a), (b), (c), and (d) of FIG. 4, the noise vibration induced by an actuation of the engine 1 is superimposed on the vibration waveform at the same position even when the spark timing varies. More specifically, although the spark position advances sequentially from the boxes (a), (b), (c), and (d) of FIG. 4, the noise vibration is always superimposed on the vibration waveform from the TDC (Top Death Center) to 5 [deg. ATDC (After Top Death Center)] independently of the movement of the spark position. In this manner, the noise vibration induced by an actuation of the engine 1 is superimposed on the vibration waveform at the same position independently of the spark timing. Hence, in a case where the vibration position of the vibration waveform is used intact for a detection of the ignition timing, the noise vibration is erroneously detected as the ignition timing.

In order to eliminate this inconvenience, the control apparatus of the internal combustion engine according to the first embodiment of the invention detects the vibration position by combustion according to the standard deviation of the vibration waveform calculated at every crank angle in accordance with Equations (1) and (2) above. More specifically, the control apparatus detects a position at which the standard deviation of the vibration waveform exceeds the first determination level J1 as the vibration position. Also, because the combustion-induced vibration is small in a state where the spark timing is retarded, it becomes difficult to detect the vibration position. In such a state, detection accuracy of the vibration position by combustion, that is, the ignition timing becomes poor. Hence, a calculation of the actual ignition timing according to the vibration position is inhibited. More specifically, a calculation of the actual ignition timing by the actual ignition timing calculation unit 24 is inhibited in a state where the peak value of the standard deviation of the vibration waveform is below the second determination level J2.

By calculating the actual ignition timing according to the standard deviation of the vibration waveform as described above, it becomes possible to eliminate an inconvenience that the noise vibration is erroneously detected as the combustion-induced vibration. It thus becomes possible to detect the ignition timing with accuracy and hence to adjust the ignition timing with accuracy.

Figure 5:
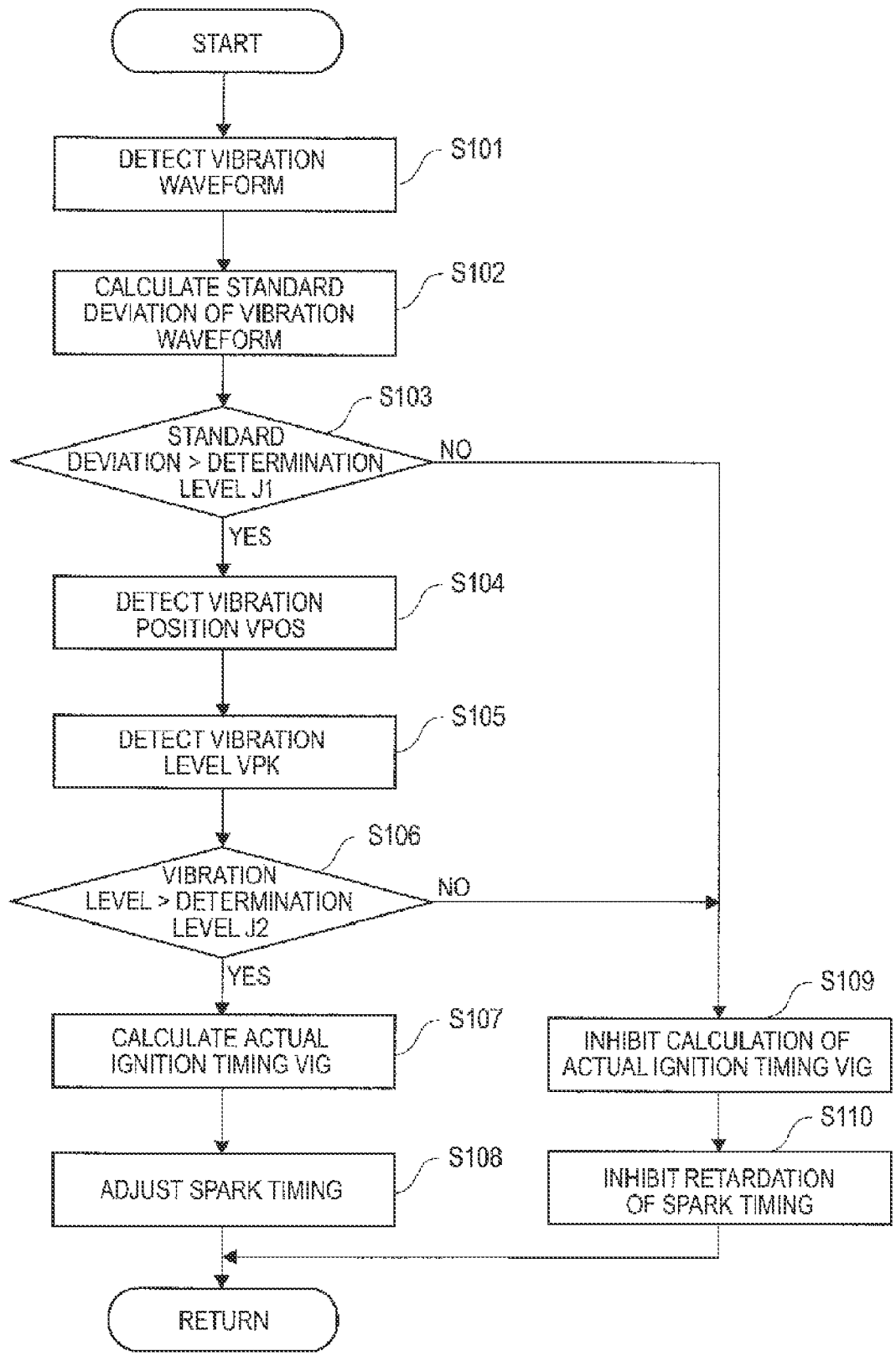
FIG. 5 is a flowchart depicting an operation according to an ignition timing control function furnished to the control apparatus of the internal combustion engine according to the first embodiment of the invention.

An operation of the control apparatus of the internal combustion engine according to the first embodiment of the invention will now be described using a flowchart. FIG. 5 is a flowchart depicting an operation according to the ignition timing control function furnished to the control apparatus of the internal combustion engine according to the first embodiment of the invention. Referring to FIG. 5, in Step S101, the control apparatus detects vibration intensity with respect to a crank angle as the vibration waveform according to output signals from the knock sensor 11 and the crank angle sensor 9. A section over which to detect the vibration waveform is empirically set in advance so as to include the actual ignition timing.

The control apparatus then proceeds to Step S102 in which the control apparatus calculates the standard deviation of the vibration waveform, VSGM, by applying filter processing to the vibration waveform detected in Step S101 over a plurality of ignition cycles at every predetermined crank angle (for example, every 1 [deg. CA]). The control apparatus calculates the standard deviation of the vibration waveform, VSGM, in accordance with Equations (1) and (2) above.

Subsequently, the control apparatus proceeds to Step S103 in which the control apparatus determines whether the standard deviation of the vibration waveform, VSGM, calculated in Step S102 is above the first determination level J1. In a case where the control apparatus determines in Step S103 that the standard deviation of the vibration waveform, VSGM, is above the first determination level J1 (YES) as are shown in the vibration waveform standard deviation waveform charts (3) in the boxes (b), (c), and (d) of FIG. 4, the control apparatus proceeds to Step S104. The control apparatus then detects the crank angle at which the standard deviation of the vibration waveform, VSGM, exceeds the first determination level J1 as the vibration position VPOS. On the other hand, in a case where the control apparatus determines in Step S103 that the standard deviation of the vibration waveform, VSGM, is not above the first determination level J1 (NO) as is shown in the box (a) of FIG. 4, the control apparatus determines that the combustion-induced vibration is small. Hence, the control apparatus proceeds to Step S109 in which a calculation of the actual ignition timing is inhibited. In subsequent Step S110, an adjustment of retarding the spark timing is inhibited.

In subsequent Step S105, the control apparatus detects the peak value of the standard deviation of the vibration waveform, VSGM, calculated in Step S102, as the vibration level. In subsequent Step S106, the control apparatus determines whether the vibration level detected in Step S105 is above the second determination level J2.

In a case where the control apparatus determines in Step S106 that the vibration level is above the second determination level J2 (YES), the control apparatus proceeds to Step S107. The control apparatus then calculates the actual ignition timing VIG according to the vibration position VPOS detected in Step S104 and the characteristic map shown in FIG. 3. In subsequent Step S108, the control apparatus makes an adjustment by advancing or retarding the spark timing according to the actual ignition timing VIG calculated in Step S107 so as to achieve an optimal ignition timing.

On the other hand, in a case where the control apparatus determines in Step S106 that the vibration level is not above the second determination level J2 (NO), the control apparatus determines that the combustion-induced vibration is small. Hence, the control apparatus proceeds to Step S109 in which a calculation of the actual ignition timing VIG is inhibited. In subsequent Step S110, an adjustment of retarding the spark timing is inhibited. Consequently, it becomes possible to avoid poor combustion, such as accidental fire, caused by when the ignition timing becomes too late.

The control apparatus of the internal combustion engine according to the first embodiment of the invention described above embodies inventions set forth in (1) through (4) as follows.

(1) A control apparatus of an internal combustion engine includes: a knock sensor that detects a vibration of the internal combustion engine and generates an output containing a signal corresponding to the detected vibration; a crank angle sensor that detects a crank angle of the internal combustion engine and outputs a signal corresponding to the detected crank angle; a vibration waveform calculation unit that calculates a vibration waveform of a knock-specific frequency component of the internal combustion engine over a plurality of ignition cycles of the internal combustion engine according to an output of the knock sensor and an output of the crank angle sensor; a vibration waveform standard deviation calculation unit that calculates a standard deviation of the calculated vibration waveform over the plurality of ignition cycles; a vibration position detection unit that detects, as a vibration position by combustion of the internal combustion engine, a position corresponding to the crank angle at which the calculated standard deviation of the vibration waveform exceeds a predetermined first determination level; an actual ignition timing calculation unit that calculates an actual ignition timing of the internal combustion engine according to the detected vibration position; and an ignition timing adjustment unit that is capable of adjusting an ignition timing of the internal combustion engine according to the calculated actual ignition timing.

The control apparatus of an internal combustion engine configured as above is capable of detecting the ignition timing with accuracy and without influences of a noise vibration independently of a combustion method of the internal combustion engine and hence capable of controlling an ignition timing with accuracy.

(2) The control apparatus of an internal combustion engine set forth in (1) above further includes a vibration level detection unit that detects a peak value of the standard deviation of the vibration waveform calculated by the vibration waveform standard deviation calculation unit as a vibration level of the internal combustion engine, and a calculation of the actual ignition timing by the actual ignition timing calculation unit is inhibited when the detected vibration level is below a predetermined second determination level.

The control apparatus of an internal combustion engine configured as above is capable of avoiding an adjustment of the ignition timing according to an erroneous actual ignition timing by inhibiting a calculation of the ignition timing according to the vibration position in a case where, for example, the vibration level induced by combustion drops due to a too-late ignition timing, because a correlation between the detected vibration position and the ignition timing cannot be secured in such a case.

(3) The control apparatus of an internal combustion engine set forth in (1) or (2) above is configured in such a manner that a calculation of the actual ignition timing by the actual ignition timing calculation unit is inhibited when the standard deviation of the vibration waveform calculated by the vibration waveform standard deviation calculation unit does not exceed the first determination level.

In a case where the vibration level by combustion is small as in a case where a calculation of the actual ignition timing is inhibited, the ignition timing is already too late. Hence, the control apparatus of an internal combustion engine configured as above is capable of avoiding poor combustion, such as an accidental fire, caused by further retarding the ignition timing.

(4) The control apparatus of an internal combustion engine set forth in (2) or (3) above is configured in such a manner that an adjustment of retarding the ignition timing by the ignition timing adjustment unit is inhibited while the calculation of the actual ignition timing is inhibited.

In a case where the vibration level by combustion is small as in a case where a calculation of the actual ignition timing is inhibited, the ignition timing is already too late. Hence, the control apparatus of an internal combustion engine configured as above is capable of avoiding poor combustion, such as an accidental fire, caused by further retarding the ignition timing.

Various modifications and alterations of this invention will be apparent to those skilled in the art without departing from the scope and spirit of this invention, and it should be understood that this is not limited to the illustrative embodiments set forth herein.

What is claimed is:

1. A control apparatus of an internal combustion engine, comprising:
    a knock sensor that detects a vibration of the internal combustion engine and generates an output containing a signal corresponding to the detected vibration;
    a crank angle sensor that detects a crank angle of the internal combustion engine and outputs a signal corresponding to the detected crank angle;
    a vibration waveform calculation unit that calculates a vibration waveform of a knock-specific frequency component of the internal combustion engine obtained from vibration intensity values gathered in a plurality of ignition cycles of the internal combustion engine according to the output of the knock sensor and the output of the crank angle sensor;
    a vibration waveform standard deviation calculation unit that calculates a standard deviation of the calculated vibration waveform obtained from the plurality of ignition cycles;
    a vibration position detection unit that detects, as a vibration position by combustion of the internal combustion engine, a position corresponding to the crank angle at which the calculated standard deviation of the vibration waveform exceeds a predetermined first determination level;
    an actual ignition timing calculation unit that calculates an actual ignition timing of the internal combustion engine according to the detected vibration position; and
    an ignition timing adjustment unit that is capable of adjusting an ignition timing of the internal combustion engine according to the calculated actual ignition timing.

2. The control apparatus of an internal combustion engine according to claim 1, further comprising:
a vibration level detection unit that detects a peak value of the standard deviation of the vibration waveform calculated by the vibration waveform standard deviation calculation unit as a vibration level of the internal combustion engine,
wherein a calculation of the actual ignition timing by the actual ignition timing calculation unit is inhibited when the detected vibration level is below a predetermined second determination level.

3. The control apparatus of an internal combustion engine according to claim 1, wherein
a calculation of the actual ignition timing by the actual ignition timing calculation unit is inhibited when the standard deviation of the vibration waveform calculated by the vibration waveform standard deviation calculation unit does not exceed the first determination level.

4. The control apparatus of an internal combustion engine according to claim 2, wherein
a calculation of the actual ignition timing by the actual ignition timing calculation unit is inhibited when the standard deviation of the vibration waveform calculated by the vibration waveform standard deviation calculation unit does not exceed the first determination level.

5. The control apparatus of an internal combustion engine according to claim 2, wherein
an adjustment of retarding the ignition timing by the ignition timing adjustment unit is inhibited while the calculation of the actual ignition timing is inhibited.

6. The control apparatus of an internal combustion engine according to claim 1, wherein the vibration waveform standard deviation calculation unit calculates the standard deviation of the vibration waveform over the predetermined ignition cycles using the following equations: $VIA[n]=KVIA \times VIA[n-1]+(1-KVIA) \times VI[n]$ is a mean value of vibration intensity (vibration waveform mean value), $VI[n]$ is vibration intensity, and KVIA is a filter coefficient for calculation of a mean value; and $VSGM[n]=KVSGM \times VSGM[n-1]+(1-KVSGM) \times (VI[n]-VIA[n])$, wherein $VSGM[n]$ is a standard deviation of vibration intensity (vibration waveform standard deviation), KVSGM is a filter coefficient for calculation of a standard deviation.

7. The control apparatus of an internal combustion engine according to claim 1, wherein the adjusting of the ignition timing by the ignition timing adjustment unit comprises advancing or retarding spark timing based on the calculated actual ignition timing.

8. A method of controlling an internal combustion engine comprising:
detecting a vibration of the internal combustion engine;
generating a signal corresponding to the detected vibration;
detecting a crank angle of the internal combustion engine;
generating a signal corresponding to the detected crank angle;
generating a vibration waveform of a knock-specific frequency component of the internal combustion engine based on vibration intensities obtained in a plurality of ignition cycles of the internal combustion engine and based on the generated signal of the detected vibration and based on the generated signal of the detected crank angle;
generating a standard deviation of the generated vibration waveform obtained from the plurality of ignition cycles;
detecting a position of the crank angle at which the generated standard deviation of the vibration waveform exceeds a predetermined threshold; and
determining ignition timing of the internal combusting engine based on the detected position of the crank angle; and
adjusting actual ignition timing of the internal combustion engine according to the determined ignition timing.

9. The method of claim 8, further comprising frequency analyzing the generated signal of the detected vibration and the generated signal of the detected crank angle to filter the vibration waveform to a predetermined frequency component to output the knock-specific frequency component.

10. The method of claim 9, wherein the frequency analyzing comprises one of discrete Fourier transform processing and short-time Fourier transform processing.

* * * * *